(12) United States Patent
Habumuremyi et al.

(10) Patent No.: US 8,959,899 B2
(45) Date of Patent: Feb. 24, 2015

(54) SCR SYSTEM AND METHOD FOR THE PURGING THEREOF

(71) Applicant: Inergy Automotive Systems Research (Societe Anonyme), Brussels (BE)

(72) Inventors: Jean-Claude Habumuremyi, Haaltert (BE); Frederic Peucat, Brussels (BE); Nicolas Duret, Nancy (FR); Stephane Leonard, Brussels (BE); Guillaume Zeller, Brussels (BE)

(73) Assignee: Inergy Automotive Systems Research, Brussels (BE)

( * ) Notice: Subject to any disclaimer, the term of this patent is extended or adjusted under 35 U.S.C. 154(b) by 0 days.

(21) Appl. No.: 13/740,895

(22) Filed: Jan. 14, 2013

(65) Prior Publication Data

US 2013/0263580 A1 Oct. 10, 2013

Related U.S. Application Data

(63) Continuation of application No. 12/676,653, filed as application No. PCT/EP2008/062184 on Sep. 12, 2008, now Pat. No. 8,393,144.

(30) Foreign Application Priority Data

Sep. 14, 2007 (FR) .................................... 07 57602

(51) Int. Cl.
*F01N 3/00* (2006.01)
*F01N 3/08* (2006.01)
*F01N 3/20* (2006.01)

(52) U.S. Cl.
CPC ...... *F01N 3/08* (2013.01); *F01N 3/208* (2013.01); *B01D 2251/2067* (2013.01);

(Continued)

(58) Field of Classification Search
CPC ...... F02D 41/029; F01N 9/002; F01N 3/0842; F01N 3/035; F01N 13/02; F04B 49/06; F04B 49/02; F04B 49/065; E21B 47/0008; E21B 47/02
USPC ............... 60/274, 295, 296, 301; 417/12, 315
See application file for complete search history.

(56) References Cited

U.S. PATENT DOCUMENTS 5,884,475 A * 3/1999 Hofmann et al. ............... 60/274
6,063,350 A * 5/2000 Tarabulski et al. ......... 423/239.1

(Continued)

FOREIGN PATENT DOCUMENTS

DE 102004054238 A1 5/2006
DE 102006007554 8/2007

(Continued)

OTHER PUBLICATIONS

DIN 70070 (Aug. 2003-Aug. 2005) standard: "Diesel engines NOx•Reduction agent AUS 32 Quality requirements", Aug. 2005; 11 pgs—with attached translation in English Language (15 pgs).

(Continued)

*Primary Examiner* — Thomas Denion
*Assistant Examiner* — Patrick Maines
(74) *Attorney, Agent, or Firm* — Oblon, Spivak, McClelland, Maier & Neustadt, L.L.P.

(57) ABSTRACT

SCR system for treating the exhaust gases of an internal combustion engine, this system comprising a line for feeding a urea solution into the exhaust gases and a pump capable both of feeding the urea solution into the exhaust gases and of purging at least one part of the line by sucking a gas therethrough by means of a suction device, this system also comprising a control unit capable of activating and/or deactivating the operation of the pump and that of the suction device in a sequential manner in the course of one and the same purge procedure.

7 Claims, 4 Drawing Sheets

(52) U.S. Cl.
CPC ...... *B01D 2257/404* (2013.01); *F01N 2610/02* (2013.01); *F01N 2610/1473* (2013.01); *F01N 2610/1493* (2013.01); *F01N 2900/0422* (2013.01); *F01N 2900/08* (2013.01); *F01N 2900/1808* (2013.01); *Y02T 10/24* (2013.01)
USPC .................. 60/295; 60/301; 60/274; 417/12; 417/315

(56) References Cited

U.S. PATENT DOCUMENTS

| | | | |
|---|---|---|---|
| 6,912,846 B2 * | 7/2005 | Huber et al. | 60/286 |
| 7,937,932 B2 * | 5/2011 | Hager et al. | 60/286 |
| 8,225,598 B2 * | 7/2012 | Haeberer et al. | 60/286 |
| 8,234,854 B2 * | 8/2012 | Kesse et al. | 60/286 |
| 8,256,211 B2 * | 9/2012 | Asaura et al. | 60/295 |
| 8,312,863 B2 * | 11/2012 | Ibrahim et al. | 123/446 |
| 8,375,702 B2 * | 2/2013 | Nishimura et al. | 60/286 |
| 8,459,012 B2 * | 6/2013 | Sun et al. | 60/295 |
| 8,505,371 B2 * | 8/2013 | Zimmerman et al. | 73/114.69 |
| 2005/0069468 A1 * | 3/2005 | Huber et al. | 422/172 |
| 2005/0252201 A1 | 11/2005 | Lecea et al. | |
| 2007/0283685 A1 * | 12/2007 | Ripper et al. | 60/288 |
| 2008/0034733 A1 | 2/2008 | Miller et al. | |
| 2008/0148716 A1 * | 6/2008 | Nishibu et al. | 60/295 |
| 2008/0282681 A1 * | 11/2008 | Katou et al. | 60/286 |
| 2008/0314452 A1 * | 12/2008 | Smith | 137/3 |
| 2009/0028729 A1 * | 1/2009 | Jochumsen et al. | 417/413.1 |
| 2009/0077949 A1 * | 3/2009 | Kleinknecht | 60/286 |
| 2009/0101656 A1 * | 4/2009 | Leonard | 220/562 |
| 2009/0126348 A1 * | 5/2009 | Hager et al. | 60/286 |

FOREIGN PATENT DOCUMENTS

| | | |
|---|---|---|
| FR | 2879239 A1 | 6/2006 |
| FR | 2918576 A1 | 1/2009 |
| FR | 2918718 A1 | 1/2009 |
| JP | 3017601 | 12/1999 |
| WO | WO 2006064028 A1 * | 6/2006 |
| WO | WO 2007141312 A1 | 12/2007 |
| WO | WO 2008006840 A1 | 1/2008 |
| WO | WO 2008087153 A1 | 7/2008 |
| WO | WO 2009007405 A1 | 1/2009 |

OTHER PUBLICATIONS

Office Action issued Aug. 22, 2014 in Korean Patent Application No. 2010-7007766 (with English translation.

* cited by examiner

SCR SYSTEM AND METHOD FOR THE PURGING THEREOF

CROSS-REFERENCE TO RELATED APPLICATIONS

This application is a continuation of and claims the benefit of priority under 35 U.S.C. §120 from U.S. Ser. No. 12/676,653 filed Mar. 5, 2010, which is a U.S. national stage application under 35 U.S.C. §371 of International Application No. PCT/EP2008/062184 filed Sep. 12, 2008, which claims priority to French Patent Application No. 07577602 filed Sep. 14, 2007, these applications being incorporated herein by reference in their entirety for all purposes.

TECHNICAL FIELD OF THE INVENTION

The present application relates to an SCR system and a method for purging such a system.

BACKGROUND OF THE INVENTION

Legislations on vehicle and heavy goods vehicle emissions stipulate, amongst other things, a reduction in the release of nitrogen oxides $NO_x$ into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the pyrolytic decomposition of an ammonia precursor solution, whose concentration may be the eutectic concentration. Such an ammonia precursor is generally a urea solution.

With the SCR process, the high levels of $NO_x$ produced in the engine during combustion at optimized efficiency are treated in a catalyst on exiting the engine. This treatment requires the use of the reducing agent at a precise concentration and of extreme quality. The solution is thus accurately metered and injected into the exhaust gas stream where it is hydrolysed before converting the nitrogen oxide ($NO_x$) to nitrogen ($N_2$) and water ($H_2O$).

In order to do this, it is necessary to equip the vehicles with a tank containing an additive (generally urea) solution and also a device for metering the desired amount of additive and injecting it into the exhaust line.

Given that the aqueous urea solution generally used for this purpose (eutectic solution containing 32.5 wt % of urea) freezes at −11° C., it is necessary to provide a heating device to liquefy the solution in order to be able to inject it into the exhaust line in the event of starting in freezing conditions.

Moreover, with a view to facilitating the operation, the re-starting of the system in case of freezing and to prevent the often flexible tubing that transports the urea from bursting, it is advantageous to purge the conduits after operating the system. In particular, it is advantageous to purge the line connecting the additive tank to the injector (or injection line) and the return line, where appropriate.

Several systems have been provided in the prior art for this purpose.

Thus, Application WO 2006/064028 in the name of the Applicant proposes an SCR system where purging of the line(s) takes place by sucking the exhaust gases through the injector using the pump of the system, which for this purpose either rotates in the opposite direction or is associated with a valve that makes it possible to reverse the flow. The advantage of this system is its simplicity and the reduced number of modifications that must be made to it in order to add this function (this is because it suffices to choose a pump that rotates in both directions or to provide a 4-way valve in the system).

This document also mentions the fact that it is preferable not to purge directly after shutting off the engine as the gases might be too hot and might damage certain parts of the system. For this purpose it recommends a temperature control in order to adjust the time delay before purging.

However, it would appear that this problem is not, in reality, truly critical (no doubt because as soon as the engine is shut off, the temperature in the exhaust pipe drops rapidly) and that, in addition, it may be prevented by choosing to suck up air from outside the exhaust pipe (and not the air/gases in said pipe). Conversely, if the purge is started immediately after the engine is shut off, there is a risk of spraying urea into the exhaust pipe and/or over the catalyst. This phenomenon is capable of causing the premature ageing of the catalyst and also corrosion problems in the exhaust pipe following the release of ammonia.

SUMMARY OF THE INVENTION

The present invention aims to solve this problem by providing a simple and economic method for purging an SCR system where spraying urea over the catalyst and/or into the silencer of the engine, once the latter is shut off, is avoided.

Hence, the present application relates to an SCR system for treating the exhaust gases of an internal combustion engine, this system comprising a line for feeding the urea solution into the exhaust gases and a pump capable both of feeding the urea solution into said exhaust gases and of purging at least one part of the line by sucking a gas therethrough by means of a suction device, this system also comprising a control unit capable of activating and/or deactivating the operation of the pump and that of the suction device in a sequential manner in the course of one and the same purge procedure.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
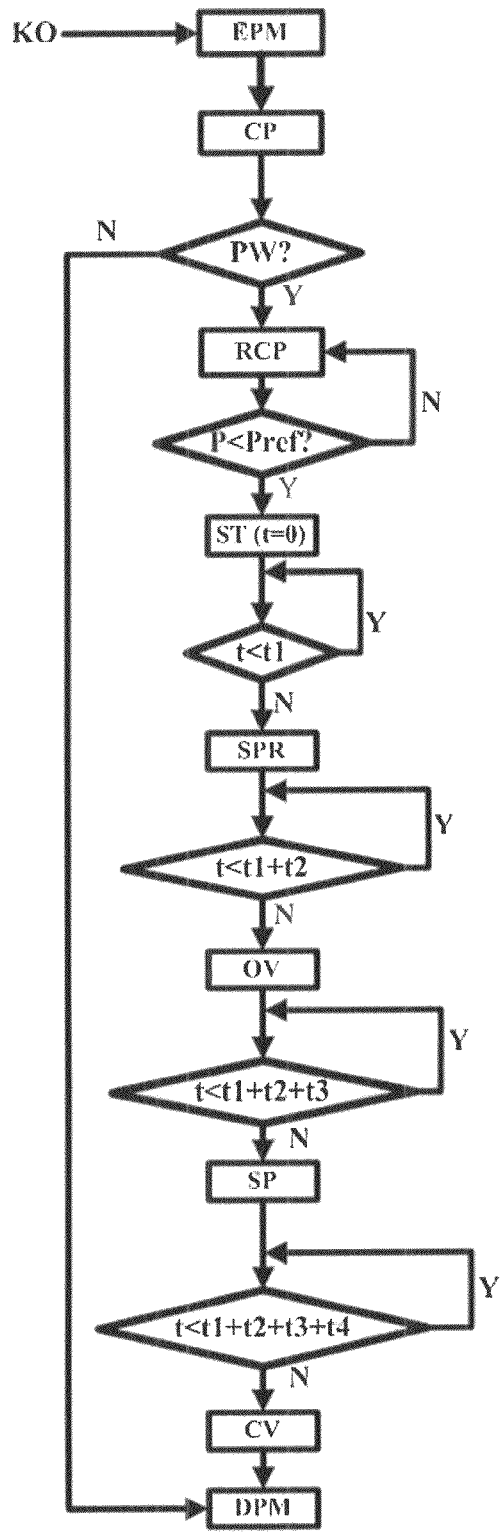
FIG. 1 consists of a block diagram of a process according to several variants of the present invention applied to a suitable SCR system.

The expression "SCR system" is understood to mean a system for the catalytic reduction of the $NO_x$ from the exhaust gases of an internal combustion engine, preferably of a vehicle, using urea as a liquid ammonia precursor. The present invention is advantageously applied to diesel engines, and in particular to the diesel engines of vehicles and particularly preferably to the diesel engines of heavy goods vehicles.

The term "urea" is understood to mean any, generally aqueous, solution containing urea. The invention gives good results with eutectic water/urea solutions for which there is a quality standard: for example, according to the standard DIN 70070, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the AdBlue® solution. The latter have the advantage of only freezing from −30° C. onwards (as opposed to −11° C.), but have the disadvantages of corrosion problems linked to the possible release of formic acid. The present invention is particularly advantageous in the context of eutectic water/urea solutions.

SCR systems generally comprise at least one tank for storing the urea solution and also a set of components for feeding this to the exhaust gases and that generally comprises active elements such as a pump, filter, valve(s), urea feed conduits (or even urea return conduits in some cases). The method according to the invention enables these components to be purged by sucking gas through them so as to drive the urea solution that they contain back to the tank.

This is because, as explained in a co-pending application in the name of the Applicant, in freezing weather it is advantageous to purge these components in order to be able to defer the heating thereof (relative to that of the tank) when the system is started up. It is also necessary to purge the system to avoid damaging the flexible tubing used to convey urea from the tank to the injector.

According to the invention, this purge is carried out using the feed pump and a device that enables a gas (air or exhaust gas) to be sucked up. This device may be an injector or a purge valve. Preferably, the purge procedure starts shortly after the engine is shut off.

The expression "purge procedure" is understood to mean the set of operations linked to the purge that are carried out as soon as the engine is shut off, this including an optional control to determine whether or not it is necessary to purge the system. This is because, during short journeys the SCR system may not have started up (because the catalyst was not at the right temperature or because, in freezing weather, the heating of the system was not sufficient to start the pump) and it is then important not to purge the lines since they are empty (having been purged when the engine was shut off previously).

Therefore, according to one preferred variant of the invention, the SCR system has a connection with the ignition key. By means of this connection the status of the engine (running or shut off) is communicated to the system and the purge procedure is started as soon as the engine is shut off using the ignition key.

The pump of the system according to the invention may be located in the urea tank (with the advantage of forming, with it, a compact and integrated module) or, considering the corrosive environment, be located outside of the urea tank. Its constituent materials will preferably be chosen from corrosion-resistant metals (especially certain grades of stainless steel and aluminium). The use of copper, even for connection components, is undesirable.

Any type of pump may be suitable. The Applicant has obtained good results with a rotary positive-displacement pump of the gear pump type and in particular, with such a magnetic drive pump (such as that described in Application FR 0756387 in the name of the Applicant, the content of which is, for this purpose, incorporated by reference in the present application). The speed of this pump is preferably driven as described in Application PCT/EP2007/057066 in the name of the Applicant (the content of which is also, for this purpose, incorporated by reference in the present application).

The purge gas (air or exhaust gas) suction device may also be of any known type. It may, for example, be a valve or the injector used for metering. Generally, SCR systems comprise an injector at the end of the feed line. In this case, either the suction valve is located very close to this injector (in order to limit the unpurged length as much as possible and/or to enable air to be sucked through the engine silencer, in which case the valve should be located in the exhaust pipe), or it is the injector itself which acts as a suction device. In practice, it is often sufficient to simply open the injector. However, when the injector is governed by a control unit other than that of the SCR system (for example, by that of the engine), the use of a valve or of any other suction device directly controlled by the control unit of the SCR system is generally called for (unless provision is made for a system of communication between the two control units, which is sometimes more complicated and/or undesired). The control units mentioned above are generally electronic units or ECUs (Electronic Control Units).

In the system according to the invention, the control unit of the SCR system is such that it makes it possible to activate and/or deactivate the operation of the pump and that of the suction device in a sequential manner.

Within the context of the invention, the term "operation" is understood to mean operation in purge mode. While it is operating in "purge" mode the pump can either rotate in the reverse direction relative to its normal mode of operation (feed mode), or rotate in the same direction if the system comprises a valve that makes it possible to reverse the flows (e.g. 4-way valve as already mentioned previously). In other words, according to one preferred variant, in order that the system can be purged effectively: either the pump is capable of rotating in two opposite directions, or the system comprises a 4-way valve that makes it possible to reverse the flow in the line without changing the direction of rotation of the pump.

According to one preferred variant of the invention, the operation of the pump in "purge" mode is only activated a certain time after the pump outlet pressure has dropped below a reference value. This is because, in particular in the case of rotary positive-displacement pumps, the pressure decreases with the motor speed and only becomes low enough when this motor speed is almost at rest.

This sequenced activation may be carried out using a timer that enables the pump to be actuated at the end of a predetermined period and/or after the pressure (p) has dropped below a reference value ($p_{ref}$), and makes it possible to open and close the device used for sucking air through the silencer.

Therefore, according to one preferred variant of the invention, the SCR system comprises a timer and a pressure sensor capable of measuring the pressure at the pump outlet. Preferably, this measurement is made in real time, i.e. at regular intervals of the order of ms (milliseconds) for example, and the control unit is capable of detecting, in real time, the moment at which this pressure drops below a reference value and, at this moment, of actuating the pump in "purge" mode and of starting the timer which finally runs to the end of a given time interval, allowing the air-suction device to open and close at predetermined times.

Alternatively, when the system does not comprise a pressure sensor, the timer may be used for actuating the pump in "purge" mode at the end of a pre-calibrated interval (which is determined experimentally) after cutting the engine and then allowing the air-suction device to open and close at predetermined times.

In these two variants, the operation of the pump in "purge" mode is therefore activated before that of the device that enables air or gas to be sucked through the silencer in order to prevent urea from being discharged into the exhaust pipe and/or over the catalyst at the start of the purge (when the lines are full of urea). Generally, the time between the activation of the pump and that of the suction device is short (typically of the order of ms) in order to avoid generating too high a vacuum in the section of the line located between the pump and the suction device (which could cause it to implode (collapse), especially in the case of lines made of plastic).

The SCR system according to the invention may comprise a non-return device that prevents liquid from entering into these elements once they have been purged. This non-return device is preferably located between the pump and the urea tank, and most particularly preferably at the junction of the purged elements with the tank.

In particular, it may be a non-return device as described in Application FR 0756388 in the name of the Applicant (the content of which is incorporated by reference in the present application). In a system that incorporates such a device, the pump, said device and a urea filter are combined in a compact module, the filter at least partly surrounding the pump and the non-return device being an integral part of a common housing that surrounds the filter and at least one part of the pump.

This compact module is preferably integrated into an immerged base plate in the liquid tank and the common housing comprises a cover and a lower part such that:
- the lower part consists of a sealed enclosure which comprises a substantially cylindrical wall equipped with a base and moulded from one part with the base plate and also a cover assembled in a sealed manner with this cylindrical wall, on which the filter rests and through which the rotation axle is inserted in a sealed manner; and
- the cover surrounds the filter and the mechanical element and is attached via a screw and nut connection to the sealed enclosure.

This cover has the shape of a bell having at least one opening in its lower part and it is positioned so as to create an annular cavity between its inner surface and the outer surface of the enclosure/filter where the liquid can be sucked up through its lower opening.

In particular in a system with a non-return device it is advantageous for the aforementioned timer to be capable of deactivating the operation of the pump before that of the suction device (typically a few ms before). This is because, in the opposite case, the pump would be capable of creating a vacuum in the section of line connecting it to the suction device and this section could then fill with liquid once the pump stops, despite the presence of the non-return device.

The period of time that the pump operates in "purge" mode is preferably long enough to purge all the liquid between the injector and the non-return device. In the variant with a bell-shaped cover described above, this period of time is preferably long enough to discharge all the liquid present in the system including under the bell (so as to keep the filter dry). This period of time varies from one system to another depending, in particular, on the length of the lines. These values are determined during calibrations (prior tests).

Figure 4:
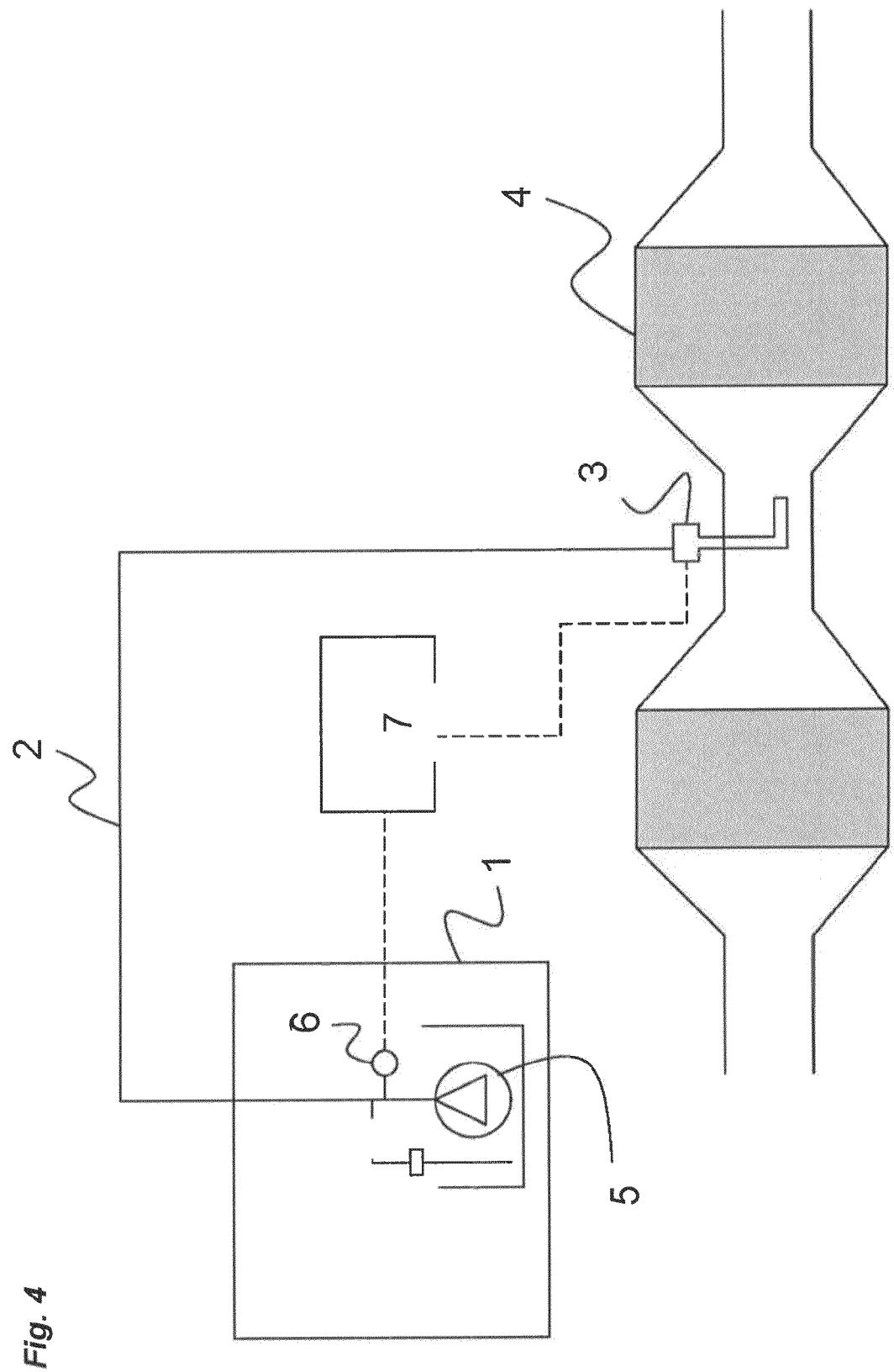
FIG. 4 illustrates an embodiment of the SCR system.

In view of the foregoing, FIG. 4 illustrates a non-binding embodiment of the above-described SCR system. The SCR system includes: a tank (1); an injection line (2); an injector (3); an exhaust pipe (4) through which exhaust gases flow; a pump (5); a pressure sensor (6); and a timer (7).

The present invention also relates to a method for purging an SCR system comprising a pump both for feeding a urea solution into said exhaust gases and for purging the system by sucking a gas therethrough by means of a suction device, according to which the operation of the pump and that of the suction device are activated and/or deactivated in a sequential manner in the course of one and the same purge procedure.

Preferably, this method uses a "real time" electronic control system. In other words: a system capable of responding to given events in set periods of time.

The preferred variants described above in the "system" part of the invention are for application within the context of the method according to the invention.

In particular, according to one particularly preferred variant of the invention, the purge procedure comprises, successively and in order, the following steps:
1. the engine shut-off is detected;
2. it is checked whether or not the pump has operated while the engine was running;
3. if the pump was not operated, the procedure is stopped;
3'. if the pump was operated, the procedure is continued by carrying out, successively and in order, the following steps:
4'. the pressure at the pump outlet is measured and when this is below a reference value ($p_{ref}$), a timer is started (t=0)
5'. when the timer detects the end of a predetermined time interval (t1), it makes the pump rotate in purge mode;
6'. when the timer detects the end of a predetermined time interval (t1+t2), the suction device is opened;
7'. when the timer detects the end of a predetermined time interval (t1+t2+t3), the pump is stopped;
8'. when the timer detects the end of a predetermined time interval (t1+t2+t3+t4), the suction device is closed.

Detection of whether or not the pump has operated may be carried out, for example, by automatically setting a parameter to "1" when the engine has run under normal temperature conditions and by setting it to "1" under freezing conditions only if the engine has run for a long enough period for the system to be hot and for the pump to have been able to start.

Figure 2:
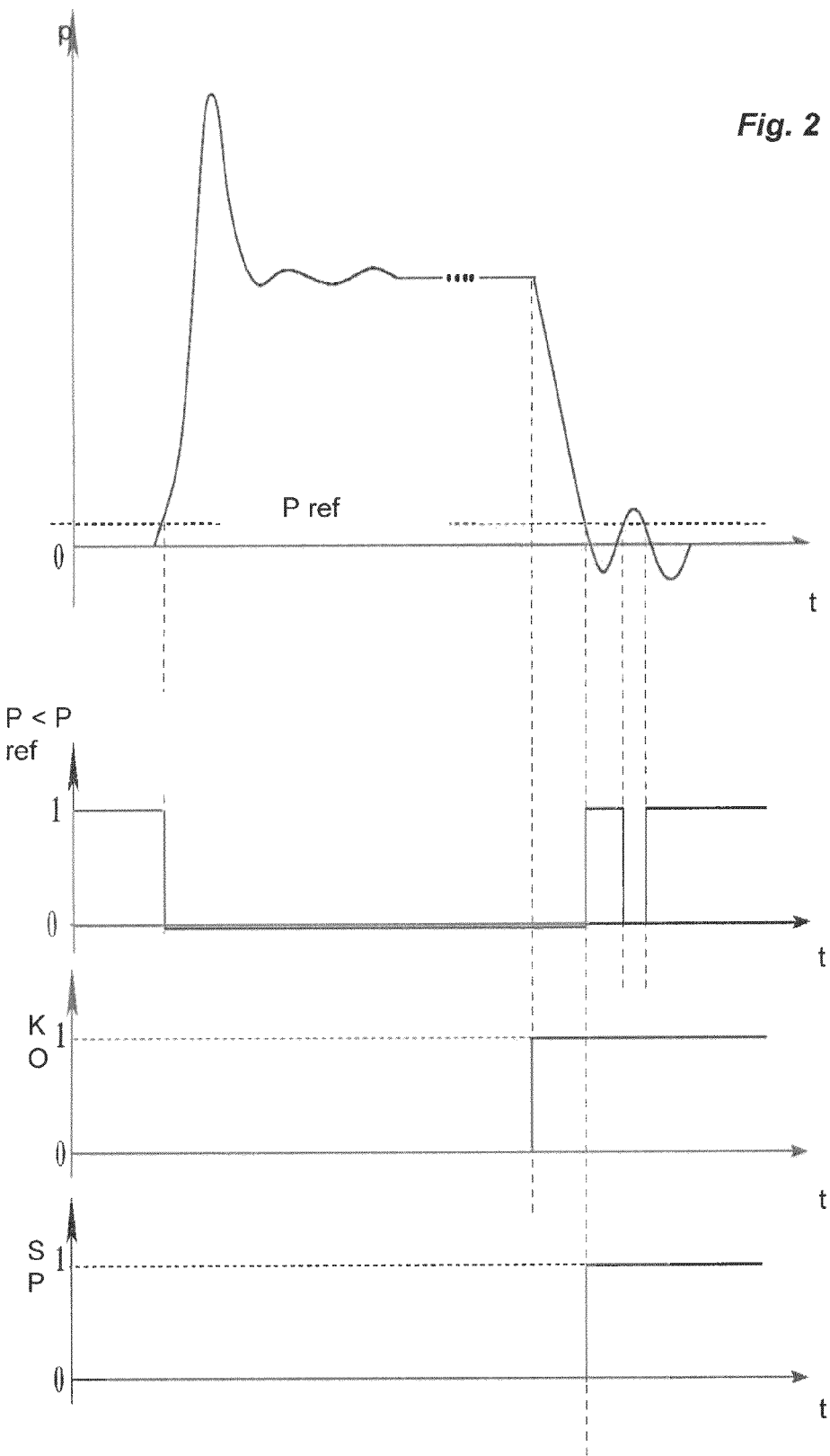
FIG. 2 illustrates the change in pressure at the outlet of a gear pump and the logic that results therefrom in an SCR system.

The method according to the invention is illustrated, in a non-limiting manner, by appended FIGS. 1 and 2. FIG. 1 consists of a block diagram of a process according to several variants of the present invention applied to a suitable SCR system; and FIG. 2 illustrates the change in pressure at the outlet of a gear pump and the logic that results therefrom in an SCR system.

The process illustrated in FIG. 1 can be applied to an SCR system comprising a feed pump; a sensor of the pressure at its outlet; an electronic control unit (ECU) driven by a real-time system using a single timer; and a valve for sucking up air and/or exhaust gases.

This process is initiated by the detection of contact with the vehicle engine being cut (KO or Key Off). This therefore causes the purge procedure to be started (EPM or Enable Purge Mode).

From this moment, the ECU will check whether the pump has operated (see above) or not (CP or Control Pump).

If the pump has not run (negative response to the question PW? or Pump Worked?), the purge procedure is stopped (DPM or Disable Purge Mode).

If on the other hand the response to the question (PW?) is positive, the purge procedure is continued and the ECU will repeatedly compare the pressure value read by the sensor to a reference pressure (RCP or Read & Compare Pressure). As soon as this pressure is reached (positive response to the question p<$p_{ref}$?), the ECU starts a timer (ST or Set Timer) that sets the time to zero (t=0).

At the end of an interval t1 (which may be equal to zero), the feed pump of the system is rotated in reverse (SPR or Start Pump Reverse).

At the end of an additional interval t2 (i.e. t=t1+t2 on the timer at this moment), the suction valve is opened (OV or Open Valve).

At the end of an additional interval t3 (i.e. t=t1+t2+t3 on the timer at this moment), the pump is stopped (SP or Stop Pump).

Finally, at the end of an additional interval t4 (i.e. t=t1+t2+t3+t4 on the timer at this moment), the suction valve is closed (CV or Close Valve) and the purge procedure is stopped (DPM or Disable Purge Mode).

In FIG. 2, in its upper part, it is possible to see the shape of the curve of the pressure at the outlet of a gear pump as a function of time.

When the pump starts up a pressure increase peak is seen (which typically culminates at around 9 bar in the SCR system in question), then stabilization at the operating pressure (around 5 bar in this case). When the pump is turned off, the pressure gradually falls in order to drop below a reference value (equal to 0.2 bar in this example), but with fluctuations over a certain period of time.

The lower figures represent the logic of the phenomenon: the first illustrates, in a boolean manner, the event "pressure below the reference value" (p<p ref); the second, the event "contact broken" (KO or Key Off); and the third, the event "starting of the pump in purge mode" (SP or Start Purge).

As can be seen from these figures, it is advantageous to defer the start of the purge for a certain period of time before starting the purge in order to ensure that the pressure is low enough to prevent urea from being discharged into the exhaust pipe and/or over the catalyst. This time may either be measured effectively by a pressure sensor (case illustrated) or have been obtained experimentally by calibration tests. The pressure fluctuations illustrated in the upper part of FIG. 2, which are minor and are not capable of leading to discharges, are ignored due to the use of a timer as explained above.

The way the pump can be controlled to either feed the solution, to be stopped or to function in purge mode can be as described in application WO 2008/087153 in the name of the Applicant. The method for controlling the pump described in that document uses a single PWM signal having a duty cycle that varies in function of the desired operation conditions for the pump. In the embodiment pictured in the figure of that application, the pump controller includes a speed controller and a PID regulator in order to adapt the speed of the pump to the desired output pressure.

Figure 3:
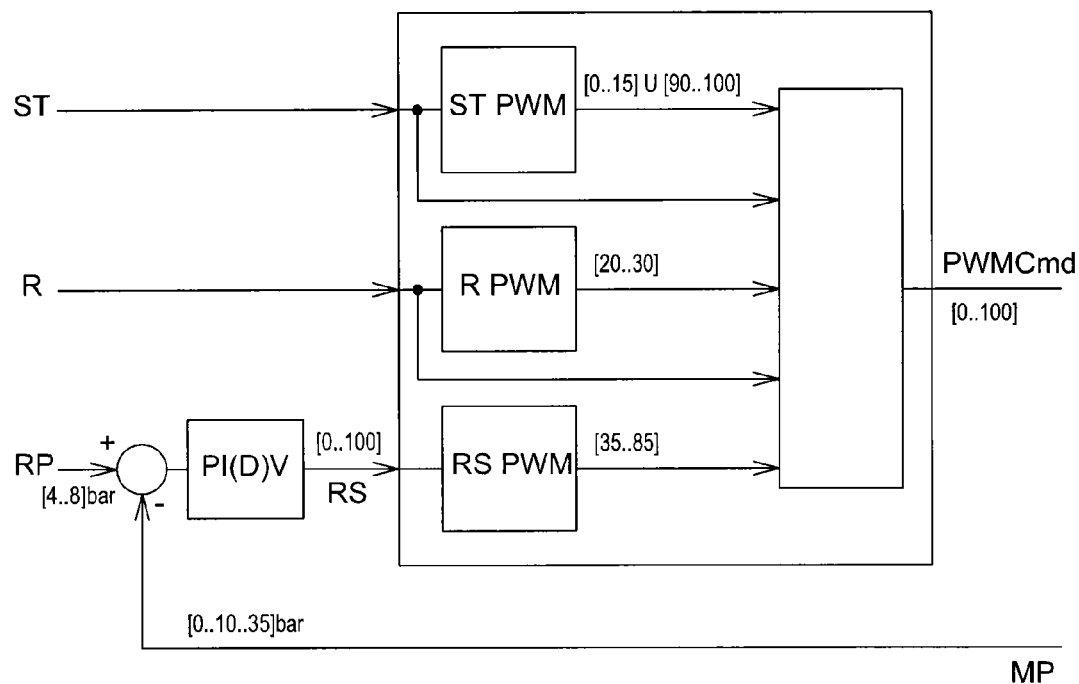
FIG. 3 illustrates an embodiment of a method for controlling the pump which includes sending a single Pulse Width Modulation (PWM) signal to a pump controller which only integrates a speed regulator, a Proportional-Integral-Derivative (PID) or Proportional-Integral (PI) regulator being integrated into an Electronic Control Unit (ECU).

FIG. 3 shows another embodiment of that method, applying the same idea of sending a single PWM signal to the pump controller, but where said controller only integrates the speed regulator, the PID regulator (or even preferably: a PI regulator) being integrated into the ECU.

As shown in this figure, the ECU is able of receiving four signals: a stop signal (ST), a reverse mode signal (R), a working (measured) pressure signal (MP) and a reference pressure signal (RP). The PI(D) regulator which is integrated into it, compares the 2 two last signals (MP, RP) and emits a PWM signal giving a rotational speed information (RS) on a scale from 0 to 100 corresponding respectively to the minimum and maximum rotational speed of the pump. The ECU then computes the (ST), (R) and (RS) signals into one single PWM signal (PWMCmd) which instructs the pump to either stop, rotate in reverse mode or rotate in forward mode at a given speed.

In the embodiment of FIG. 1 of the above mentioned WO'153 application, the ECU only receives three signals (ST, R and reference pressure) and these are directly computed in the PWM signal sent to the pump controller.

The invention claimed is:

1. A Selective Catalytic Reduction (SCR) system for treating the exhaust gases of an internal combustion engine, the system comprising:
   a line that feeds a urea solution into the exhaust gases;
   a pump that both feeds the urea solution into said exhaust gases and purges at least one part of the line by sucking a gas through the at least one part by a suction device, the pump including an outlet;
   a timer;
   a pressure sensor that measures the pressure at the pump outlet; and
   an electronic control unit configured to:
   activate and deactivate operation of the pump and operation of the suction device in a sequential manner in the course of one and a same purge procedure; and
   start the timer and actuate the pump in a purge mode if the pressure measured by the pressure sensor drops below a reference value,
   wherein the timer is configured to control the suction device to open and close at predetermined times after actuating the pump.

2. The SCR system according to claim 1, wherein the electronic control unit is further configured to activate the purge after a certain period when the engine is shut off.

3. The SCR system according to claim 1, wherein the pump is a rotary positive-displacement pump of a gear pump type.

4. The SCR system according to claim 1, further comprising:
   an injector that injects the urea solution into the exhaust gases,
   wherein the suction device is either a valve that sucks up air or exhaust gases that is located close to the injector, or is constituted by the injector itself.

5. The SCR system according to claim 1, wherein either the pump rotates in two opposite directions, or the system comprises a 4-way valve that reverses flow in the line without changing the direction of rotation of the pump.

6. The SCR system according to claim 1, wherein the electronic control unit is further configured to deactivate the operation of the pump before deactivating the operation of the suction device.

7. A Selective Catalytic Reduction (SCR) system for treating the exhaust gases of an internal combustion engine, the system comprising:
   a line that feeds a urea solution into the exhaust gases;
   a pump that both feeds the urea solution into said exhaust gases and purges at least one part of the line by sucking a gas through the at least one part by a suction device, the pump including an outlet;
   a timer;
   a pressure sensor that measures the pressure at the pump outlet; and
   an electric control unit configured to:
   activate and deactivate operation of the pump and operation of the suction device in a sequential manner in the course of one and a same purge procedure;
   start the timer if the pressure measured by the pressure sensor drops below a reference value; and
   actuate the pump by the electronic control unit in a purge mode at the end of a predetermined time interval detected by said timer, wherein the timer is configured to open and close the suction device at predetermined times after actuating the pump.

* * * * *